United States Patent [19]

Aurentz

[11] Patent Number: 4,895,482
[45] Date of Patent: Jan. 23, 1990

[54] COUNTERSINK FORMING TOOLING
[75] Inventor: John A. Aurentz, Fallbrook, Calif.
[73] Assignee: Briles Rivet Corporation, Oceanside, Calif.
[21] Appl. No.: 239,708
[22] Filed: Sep. 2, 1988

Related U.S. Application Data

[63] Continuation of Ser. No. 5,101, Jan. 20, 1987, abandoned.
[51] Int. Cl.⁴ .............................................. B23B 51/10
[52] U.S. Cl. .................................. 408/225; 408/200; 408/231; 408/238
[58] Field of Search ............... 408/199, 200, 223, 224, 408/225, 231, 233, 238, 239 R, 713

[56]  References Cited
U.S. PATENT DOCUMENTS

| | | | |
|---|---|---|---|
| 897,041 | 8/1908 | Weller | 408/200 |
| 1,017,352 | 2/1912 | Wagner | 408/224 |
| 1,131,871 | 3/1915 | Spoehr | 408/233 |
| 2,811,054 | 10/1957 | Townsend | 408/233 |
| 2,829,544 | 4/1958 | Bergstrom | 408/225 |
| 2,937,545 | 5/1960 | Rauer et al. | 408/231 |
| 3,712,753 | 1/1973 | Manzi | 408/233 |

Primary Examiner—Joseph H. McGlynn
Assistant Examiner—Daniel W. Howell
Attorney, Agent, or Firm—William W. Haefliger

[57]  ABSTRACT

Tooling to form a countersink and counterbore in a workpiece includes:
(a) a first part defining an axis and that extends axially forwardly in a bore hole in the workpiece,
(b) a rotatable carrier connected with that first part,
(c) and a cutter blade on the carrier, the blade projecting radially relative to the first part forming at least one cutting edge spaced outwardly of a cylinder defined by that first part, the cutting edge shaped to form the countersink and counterbore at one end of the bore hole.

6 Claims, 3 Drawing Sheets

4,895,482

COUNTERSINK FORMING TOOLING

This is a continuation of application Ser. No. 005,101, filed Jan. 20, 1987, now abandoned.

BACKGROUND OF THE INVENTION

This invention relates to the formation of countersinks and counterbores in workpieces, and more particularly to highly advantageous devices for forming the countersinks and counterbores.

Countersinks are typically formed in workpieces at the ends of bore holes. There is need for tooling to rapidly and easily form such countersinks, in relation to the forming of the bore holes, as by using the same drive means, and employing replaceable blade inserts.

SUMMARY OF THE INVENTION

It is a major object of the invention to provide improved tooling meeting the above need. Basically, the tooling comprises:

(a) first part defining an axis and that extends axially forwardly in the bore hole, (b) a rotatable carrier connected with said first part, (c) and a cutter blade on the carrier, the blade projecting radially relative to said first part and forming at least one cutting edge spaced outwardly of an outer surface defined by said first part, said cutting edge shaped to form the tapered countersink and or counterbore at one end of the bore hole.

As will appear, the first part typically defines a radial slot in which the blade is received; and the blade has a rearward facing edge having centering engagement with a locating edge defined by the carrier and facing forwardly. The blade may form two of such cutting edges which extend radially outwardly at radially opposite sides of said axis. For centering purposes, the replaceable blade and carrier may have tongue and groove interfit at locations radially inwardly of rearwardmost extent of the cutting edges.

In one form of the invention the first part is a forwardly extending pilot defining a cylindrical surface adapted to slidably fit in the bore hole; and in another form of the invention the first part is a fluted drill adapted to rotatably drill said bore hole. In the latter event, the carrier comprises a sleeve receiving and carrying the drill and locked thereto.

As will further appear, the blade is easily removable from the slot and replaced. The invention provides for positive depth of counter bore control, which permits the insert to seat against the locating surface, thereby centrally aligning the cutting edges, and the lengths of the various diameters control the depth of counterbore cut, without adjustment. The blades can be exchanged when dull and re-sharpened if desired.

These and other objects and advantages of the invention, as well as the details of an illustrative emobodiment, will be more fully understood from the following specification and drawings, in which:

DRAWING DESCRIPTION

DETAILED DESCRIPTION

Figure 1:
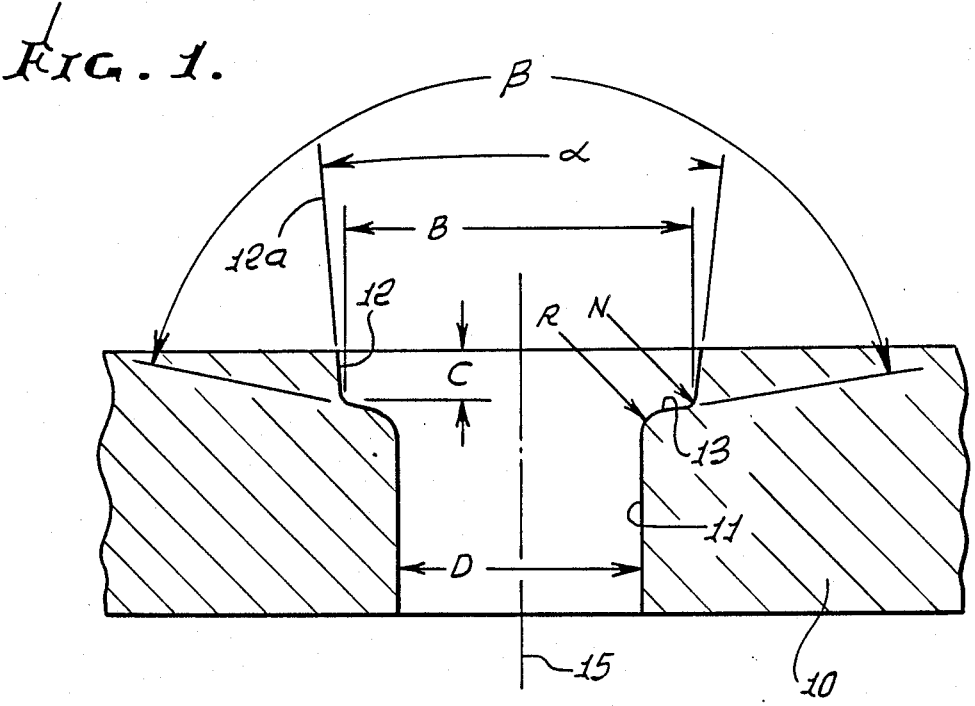
FIG. 1 is a section through a workpiece showing bore and countersink therein.

In FIG. 1, a workpiece 10, of metal or composite material has a bore 11 and a countersink counterbore 12 formed therein. The bore 11 is typically cylindrical; and the counterbore is tapered as shown at 12a, i.e. flares endwise outwardly. The included angle $\alpha$ of the flare may for example be about 11 degrees; and the included angle $\beta$ of step shoulder 13 may be about 160°. The latter flares are shown between a convex radius at R, and a concave radius at N. The diameter D, height C, and values R and N may vary, but the proportionality remains approximately the same.

Figure 2:
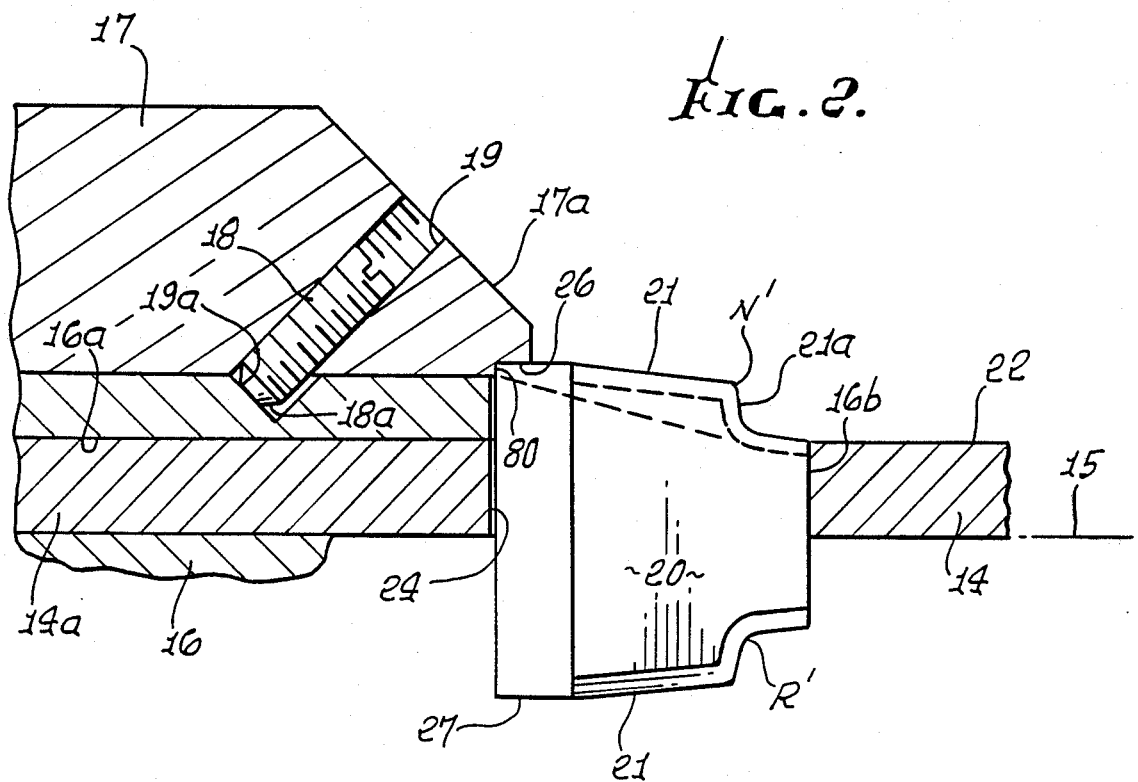
FIG. 2 is a section in elevation showing one form of the invention with the combined Fluted Drill.
Figure 3:
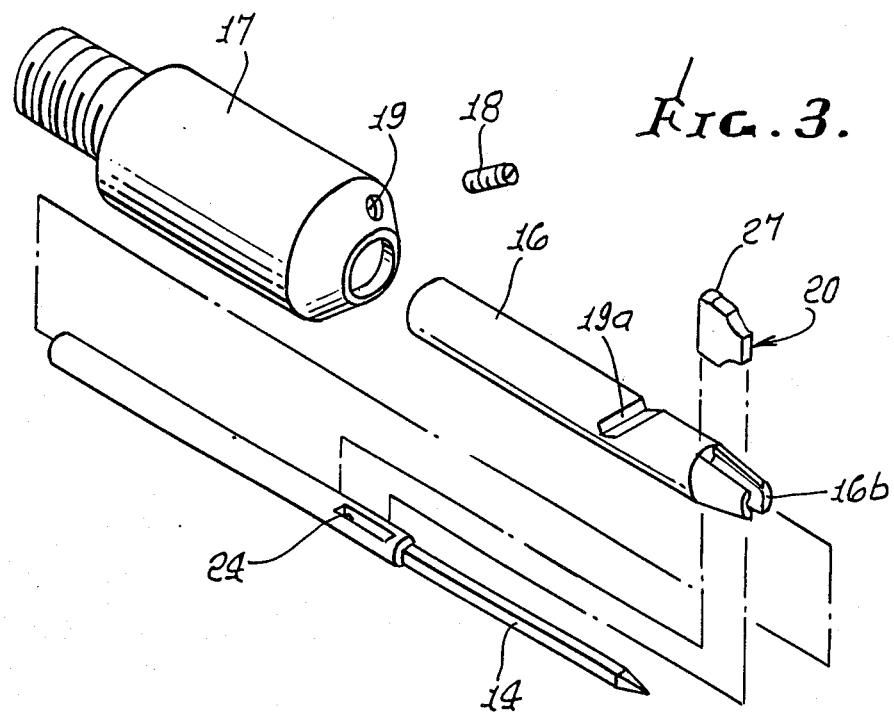
FIG. 3 is an exploded view showing the FIG. 2 assembly tooling.

It is an object of the invention to provide tooling to precisely form the annular countersink 12 and step shoulder 13, while employing a first part or element that extends forwardly in the bore hole 11 to pilot or center the cutting tool. As shown in the FIGS. 2–3 form of the invention, the first part or element comprises a fluted drill 14 employed to form the hole 11 as the drill is rotated and advanced in the direction of axis 15. A rotatable carrier for the drill comprises sleeve 16 having a bore 16a closely receiving the drill extent 14a, the sleeve terminating at end 16b. The carrier also includes a sleeve-like body 17 fitted over sleeve 16 and locked to the sleeve as by a set screw 18. Screw 18 is threaded into angled bore 19 in the body, and its end 18a fits in a locking recess 19a formed in the sleeve 16. Also, the drill end 14a is then clamped in the sleeve 16 by such means. A motor, not shown, rotates the drill.

Blade 20 may be considered as within or on the carrier and it projects radially relative to the first part (i.e. drill). It extends in a radial axial plane, and it forms at least one cutting edge 21 spaced outwardly of a cylinder 22 defined by the surface of the drill. Cutting edge 21 is shaped to form the counterbore 12 as the blade is rotated. Actually, the blade typically has like cutting edges 21, as shown, which extend radially outwardly at opposite sides of axis 15. Edges 21 have extensions 21a which also extend inwardly as shown, so as to cut or form the countersink 13 as the blade rotates.

More specifically, the drill 14 has a rectangular slot 24 extending sidewardly through the drill to closely receive the blade. The blade has rearward outer edges that have centering engagement with locating surfaces defined by the carrier, and facing forwardly. In the example the body 17 forwardly tapered extent 17a defines two notches or recesses 26 which closely receive the rearward outer corners 27 of the blade, to precisely locate the blade radially, i.e. centering it so that opposite cutting edges 21 for example are at the same distances from the axis 15. Also, endwise location of the blade is provided at 80. At the same time, torque is transmitted to the blade by the motor driven drill, as via the interior walls of the slot 24. Note the cutting edge radius N' corresponding to radius N, and the cutting edge radius R' corresponding to radius R. The blade is easily replaced, as by retracting the set screw 18, axially displacing the body 17 away from the blade, and removing the blade from the slot 24.

Figure 9:
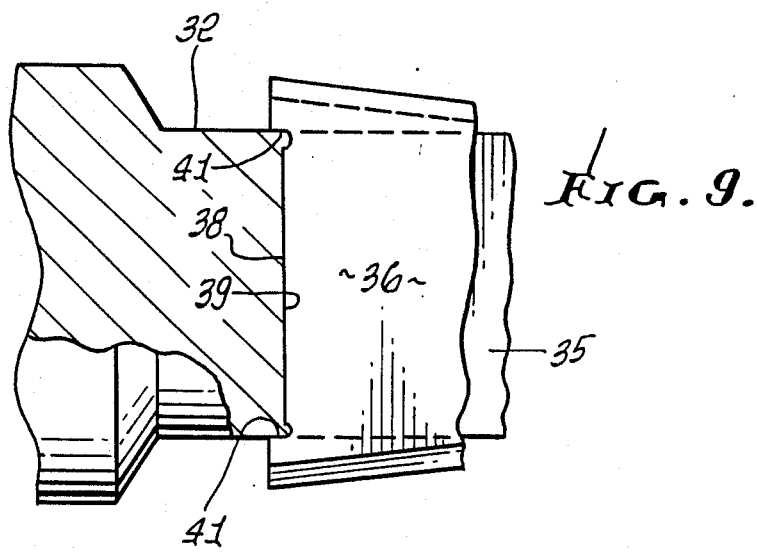
FIG. 9 is an enlarged fragmentary view on lines 9—9 of FIG. 8, detailing the centering engagement of the blade.
Figure 10:
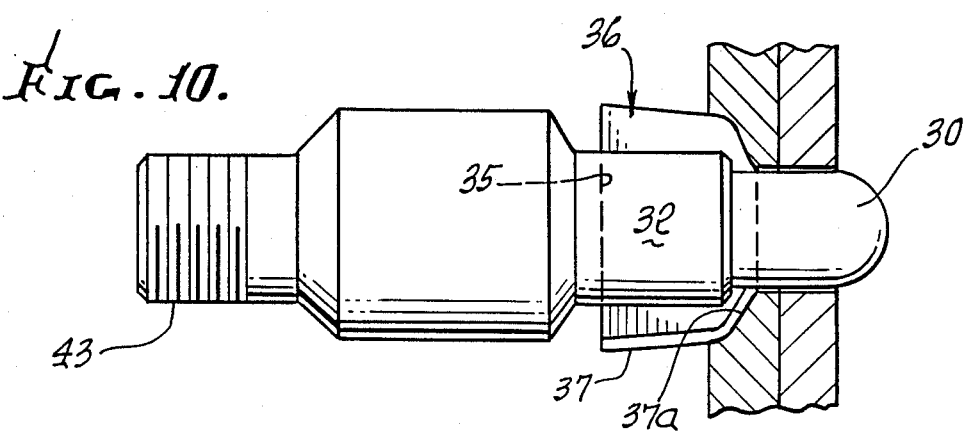
FIG. 10 is a view like FIG. 5, showing use of the tool.
Figure 4:
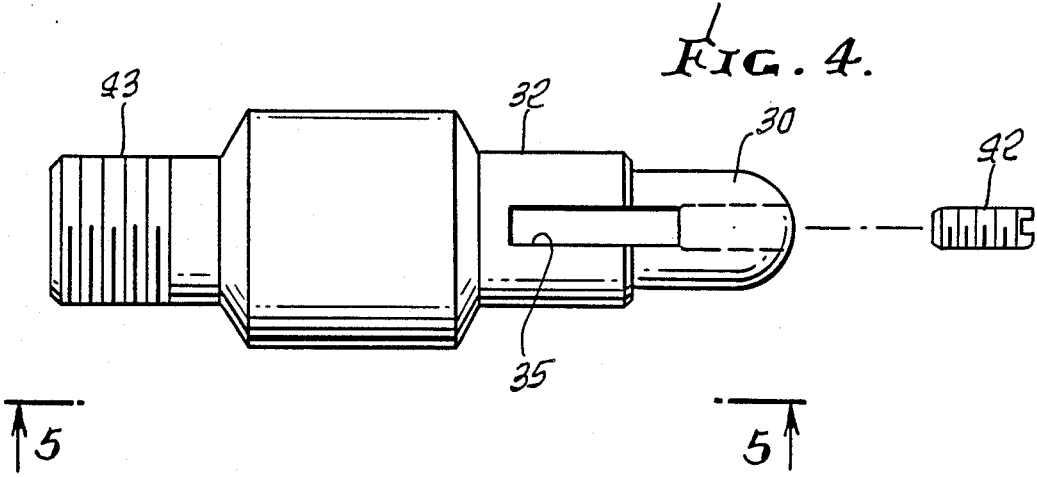
FIG. 4 is a top view showing another form of the tooling with a piloted diameter and the rectangular blade location.
Figure 5:
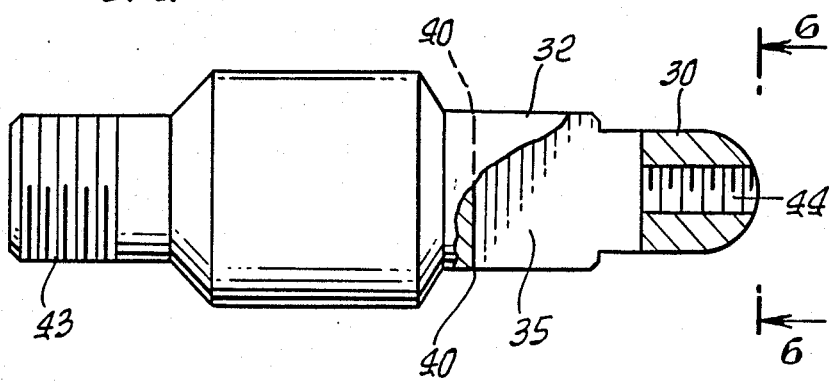
FIG. 5 is an enlarged side elevation on lines 5—5 of FIG. 4.
Figure 6:
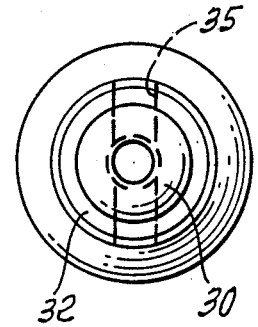
FIG. 6 is an end view taken on lines 6—6 of FIG. 5.
Figure 7:
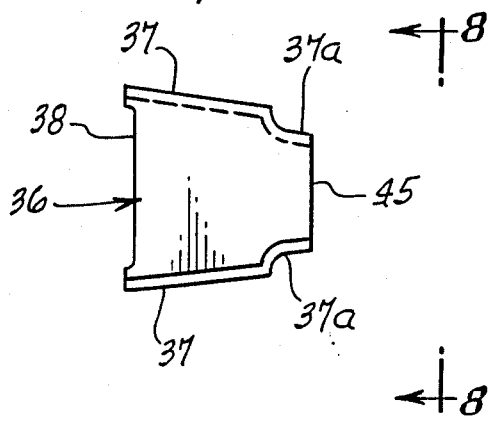
FIG. 7 is a side elevation of a cutter blade incorporated in the FIG. 4 tooling.
Figure 8:
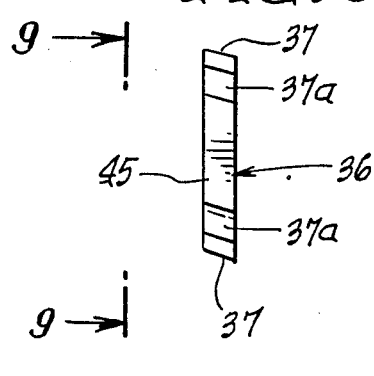
FIG. 8 is an end view on lines 8—8 of FIG. 7.

In that form of the invention shown in FIGS. 4–9, the first part or element comprises a cylindrical shaped pilot 30, integral with a carrier body 32. A rectangular through slot 35 in the body 32 receives the blade 36, which has radially opposite cutting edges 37 and 37a corresponding to edges 21 and 21a, described above. The rear transverse edge 38 of the blade defines an axial locating surface that engages forward facing edge 39 of the body. Outer rear corners 40 of the body 32 interfit recesses 41 in the blade 36, as seen in FIG. 9, to radially center the blade. Body 32 is rotated as by a suitable motor, not shown, connected at 43 to the body. A set screw 42 is engaged with internal thread 44 in pilot 30 and tightened against the blade edge 45 to apply pressure and align the blade surface 38 against facing edge 39 of the body. When cutting a counterbore/countersink at one end of a bore hole while the pilot 30 is engaged, the forwardly tapered cutting and cut edges 37 and 37a exert equal cutting forces, thus maintaining central alignment concentric with the bore hole, as shown in FIG. 10. The blade can be made in various hard materials such as carbide, "high" molybdenum content hardened tool steel, ceramic and or diamond tipped, or coated with diamond powder, or titanium nitride or other hard coatings.

While the counterbore is shown as tapered at 12a, it will be understood that it may be "straight sided", i.e. cylindrical parallel to axis 15.

I claim:

1. In tooling to form a countersink and counterbore in a workpiece, the countersink axially intersecting a bore hole in the workpiece, the combination comprising:
   (a) a first part defining an axis and that extends axially forwardly in the bore hole,
   (b) a rotatable carrier connected with said first part,
   (c) and a cutter blade on the carrier, the blade projecting radially relative to said first part and forming at least one cutting edge spaced outwardly of a cylinder defined by said first part, said cutting edge shaped to form said countersink and counterbore at one end of said bore hole,
   (d) said part having shoulder means for defining a rectangular hole in which said blade is removably received and held and said part also having a forward portion projecting forwardly of the blade and defining a surface to engage the bore hole,
   (e) and including a retainer adjustably received in said carrier and positioned to effect holding of the blade in engagement with a location edge defined by one of said part and carrier,
   (f) said carrier comprising a sleeve receiving and carrying said part, and including a tubular body interfitting said sleeve and blocked by said retainer against rotation and axial displacement relative thereto, there being means to hold the blade in the sleeve.
   (g) said first part comprising a drill adapted to rotatably drill said bore hole.

2. The combination of claim 1 wherein said blade forms two of said cutting edges which extend radially outwardly at opposite radially sides of said axis.

3. The combination of claim 2 wherein said cutting edges taper forwardly.

4. The combination of claim 1 wherein the cutter blade consists of one of the following: hardened tool steel, ceramic, carbide, or diamond tipped or coated with diamond or abrasive powder.

5. The combination of claim 1 wherein the edges of the blade which form the countersink and counterbore are tapered.

6. In tooling to form a countersink and counterbore in the workpiece, the countersink axially intersecting a bore hole in the workpiece, the combination comprising:
   (a) a first part defining an axis and that extends axially forwardly in the bore hole,
   (b) a rotatable carrier connected with said first part,
   (c) and a cutter blade on the carrier, the blade projecting radially relative to said first part and forming at least one cutting edge spaced outwardly of a cylinder defined by said first part, said cutting edge shaped to form said countersink and counterbore at one end of said bore hole,
   (d) said part having shoulder means for defining a rectangular hole in which said blade is removably received and held and said part also having a forward portion projecting forwardly of the blade and defining a surface to engage the bore hole,
   (e) and including a retainer adjustably received in said carrier and positioned to effect holding of the blade in engagement with a location edge defined by one of said part and carrier,
   (f) said carrier comprising a sleeve receiving and carrying said part, and including a tubular body interfitting said sleeve and blocked by said retainer against rotation and axial displacement relative thereto,
   (g) and wherein said first part has a forwardly elongated, fluted drill portion, adapted to rotatably drill said bore hole.

* * * * *